James R. Hyde.

Improvement in Cooking-Stoves.

No. 4,530. Reissued Aug. 29, 1871.

Witnesses.

C. H. Poole.
John R. Young

Inventor.

James R. Hyde, by
Prindle & Dyer,
Attys.

UNITED STATES PATENT OFFICE.

EDDY, CORSE & CO., OF TROY, NEW YORK, ASSIGNEES, BY MESNE ASSIGNMENTS, OF JAMES R. HYDE.

IMPROVEMENT IN COOKING-STOVES.

Specification forming part of Letters Patent No. 35,564, dated June 10, 1862; reissue No. 2,709, dated July 30, 1867; reissue No. 4,530, dated August 29, 1871.

*To all whom it may concern:*

Be it known that JAMES R. HYDE, of Troy, in the county of Rensselaer and State of New York, has invented certain new and useful Improvements in Cooking-Stoves, of which the following is a full, clear, and exact description, reference being had to the accompanying drawing making a part of this specification, in which—

Figure 1:
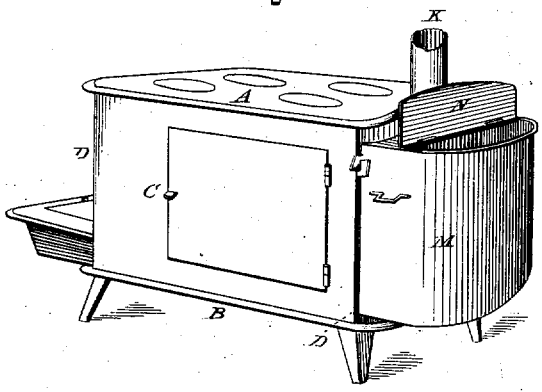
Figure 2:
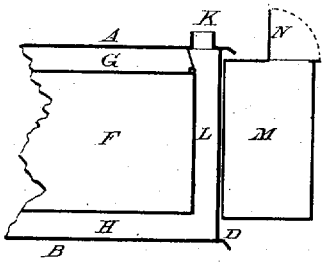
Figure 3:
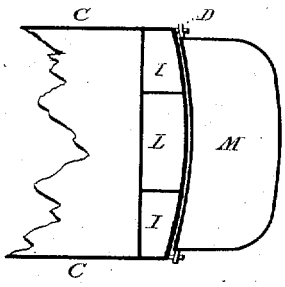

Figure 1 is a perspective view of a stove having attached thereto a water-reservoir. Fig. 2 is a vertical central section of the same on the line *x x* of Fig. 1. Fig. 3 is a horizontal section on the line *z z* of Figs. 1 and 2.

Letters of like name and kind refer to like parts in each of the figures.

The object of this invention is to utilize the heat radiated from the rear side of a cooking-stove and heretofore partially or wholly wasted; and it consists in the arrangement of a water-reservoir upon and against the rear end of a cooking-stove provided with descending and ascending-flues, substantially as and for the purpose hereinafter specified.

In the annexed drawing, A represents the top plate, and B the bottom plate, connected together by means of the vertical side plates C and front and rear plates D and E, respectively, the whole forming the exterior casing or shell of an ordinary cooking-stove. Within the casing is placed an oven, F, above and beneath which are the top and bottom oven-flues G and H, respectively, while between its rear side and the end plate E is a space divided by two partitions into two or more vertical flues, one of which, I, when said oven is being heated, receives and conveys the heated gases from said top flue G into said bottom oven-flue H, from whence they escape into the exit-pipe K by means of the other flue L, all in the usual manner. While passing through the vertical flues I and L the escaping products of combustion impart to the rear plate E as large a proportion of heat as is received by the rear-side plate of the oven, which heat is radiated into the air, and unless required for heating purposes is wasted. In order to utilize such radiated heat there is attached to or against the rear plate E a reservoir, M, constructed of metal in any desired form, except its front side, which should conform to and fit closely upon said rear plate, so as to partially or entirely prevent cold air from circulating between their contiguous surfaces. The upper side of said reservoir is inclosed by means of a cover, N, hinged or otherwise attached to its upper edge.

As thus arranged the heat given off from the rear side of the vertical flues passes through the rear plate and the front of the reservoir into said reservoir, so that, if the latter be partly or entirely filled with water, the same will receive and retain said heat until it reaches a high or corresponding temperature, after which no more heat will pass outward through said rear plate than just sufficient to supply the loss by radiation from the exterior of said reservoir. As the rear end of a stove is usually placed near the chimney or wall, but little if any useful purpose is subserved by the heat radiated outward from the same, said heat being absorbed by the dead surface of said wall or chimney, so that the employment of the reservoir upon said portion of the stove serves a double purpose, as it not only utilizes the radiated heat by causing it to impart a high temperature to water contained within said reservoir, but also acts as a jacket or casing for said end plate and the vertical flues, and when said water is thoroughly heated prevents further loss by radiation. In addition to the above, the temperature within the vertical flues is increased and rendered more uniform, and, consequently, the draught of the stove materially improved.

Although preferably placed entirely below the top plate of the stove, the reservoir may, if desired, be raised so as to bring a portion of the same above said plate, in which event, while limited in degree, the operation of the parts would be precisely the same as when arranged as before described.

Having thus fully set forth the nature and merits of the invention of the said JAMES R. HYDE, what we claim as new is—

The arrangement of a water-reservoir upon and against the rear end of a cooking-stove provided with descending and ascending-flues, substantially as and for the purpose shown and described.

In testimony whereof we have, on this 7th day of April, 1870, hereunto set our hands in presence of two witnesses.

EDDY, CORSE & CO.,
*Assignees.*

Witnesses:
MARTIN S. EDDY,
ALBERT R. CORSE.